(12) United States Patent
Chen

(10) Patent No.: US 8,300,014 B2
(45) Date of Patent: Oct. 30, 2012

(54) COMPUTER MOUSE

(75) Inventor: Song-Ya Chen, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 212 days.

(21) Appl. No.: 12/869,698

(22) Filed: Aug. 26, 2010

(65) Prior Publication Data

US 2011/0254767 A1    Oct. 20, 2011

(30) Foreign Application Priority Data

Apr. 16, 2010    (CN) .......................... 2010 1 0148840

(51) Int. Cl.
*G06F 3/033* (2006.01)

(52) U.S. Cl. ........................................ 345/163; 138/119

(58) Field of Classification Search .................. 345/163; 361/679.4; 174/135; 138/119
See application file for complete search history.

(56) References Cited

U.S. PATENT DOCUMENTS

| | | | |
|---|---|---|---|
| 4,739,801 A * | 4/1988 | Kimura et al. | 138/120 |
| 5,254,809 A * | 10/1993 | Martin | 174/68.1 |
| 6,600,479 B1 * | 7/2003 | Smith et al. | 345/163 |
| 7,159,700 B2 * | 1/2007 | Liao | 191/12.4 |

* cited by examiner

*Primary Examiner* — Kent Chang
*Assistant Examiner* — Gerald Oliver
(74) *Attorney, Agent, or Firm* — Altis Law Group, Inc.

(57) ABSTRACT

A computer mouse includes a housing, a cable, and an elastic cable retainer. The cable is capable for connecting the computer mouse to a host device. The elastic cable retainer defines a number of holes for allowing the cable to pass through. When the housing moves, the cable retainer stretched by the housing, allowing the cable to change from a compressed state to an extended state.

8 Claims, 5 Drawing Sheets

COMPUTER MOUSE

BACKGROUND

1. Technical Field

The present disclosure relates to a computer mouse.

2. Description of Related Art

A wired computer mouse is used to position a pointer on a screen of a graphical user interface (GUI). The computer mouse usually includes a housing, which is connected to a computer by a cable, when the mouse is moved over a surface such as a mouse pad a pointer moves on a screen. In order to move the mouse, the cable must have some slack near the housing. Otherwise, the user cannot freely move the mouse relative to the surface on which it is resting. However, the cable often tends to fall over the back of a desk or through a hole in a desk surface, eliminating the slack.

Therefore, what is needed is a computer mouse to overcome the described shortcoming.

DETAILED DESCRIPTION

Figure 1:
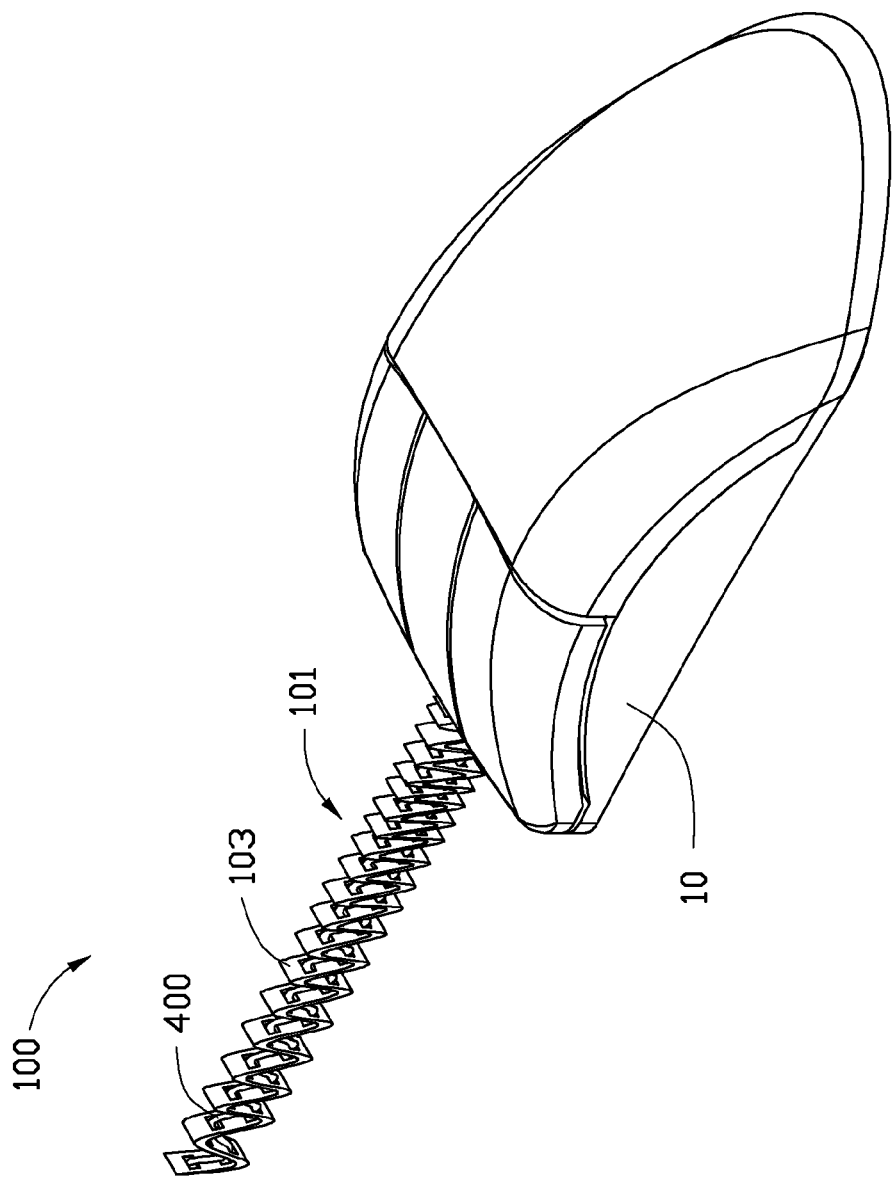
FIG. 1 is an isometric view of a computer mouse in accordance with an exemplary embodiment.
Figure 2:
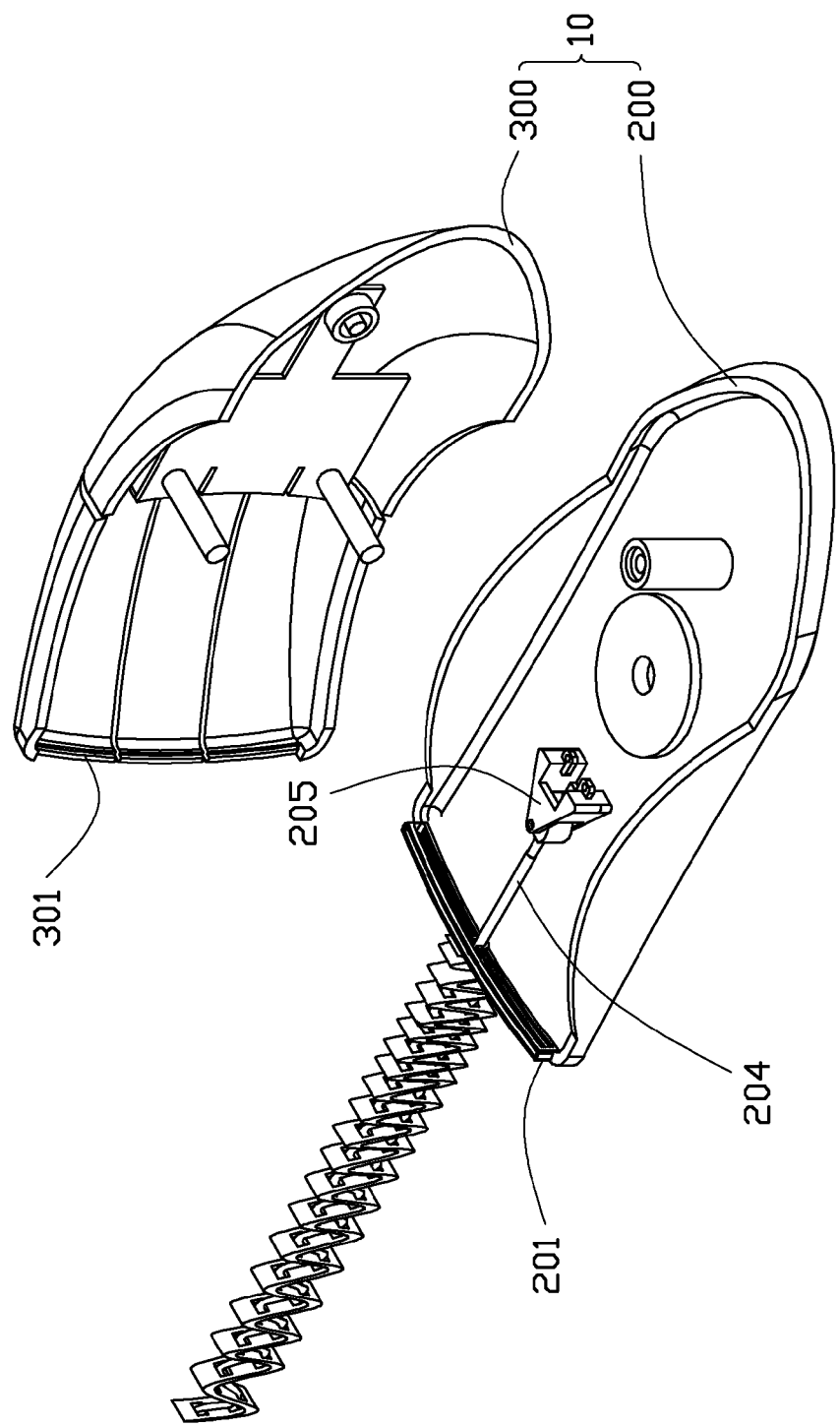
FIG. 2 is a partially exploded view of the computer mouse of FIG. 1.

Referring to FIGS. 1-2, an embodiment of a computer mouse 100 is illustrated. The computer mouse 100 includes a housing 10, a cable 400 and a cable retainer 101. The cable 400 includes a connector (i.e. a USB connector) used to connect the computer mouse 100 to a host device (not shown). When the housing 10 is moved on a support surface (not shown), the computer mouse 100 produces electronic signals according to the movement of the housing 10, and transmits the electronic signals to the host device through the cable 400. The host device receives the electronic signals, and converts the electronic signals to the movement of a pointer on a screen of a graphical user interface (GUI).

Figure 3:
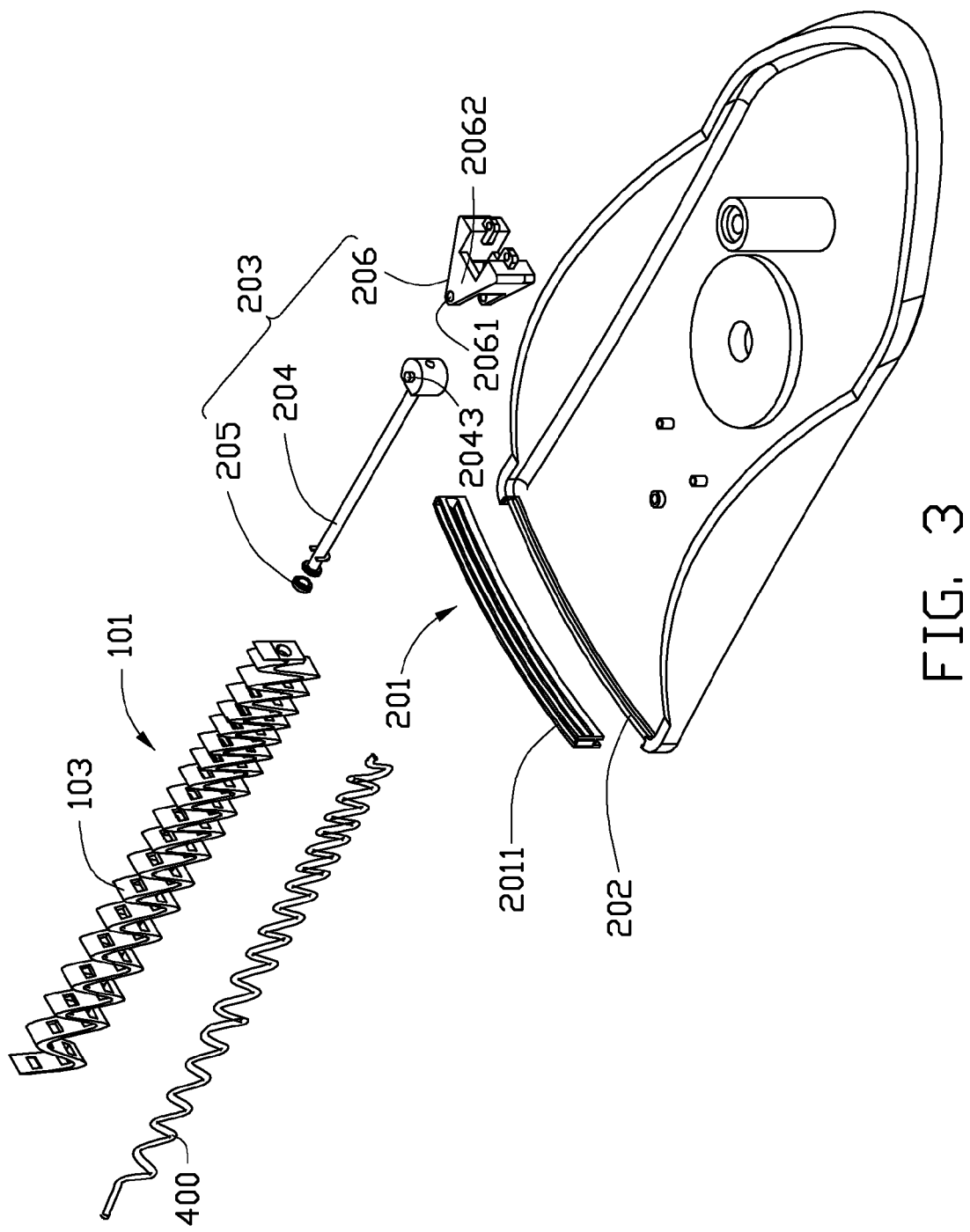
FIG. 3 is an exploded view of the computer mouse of FIG. 1, with a cover of the computer mouse omitted.
Figure 4:
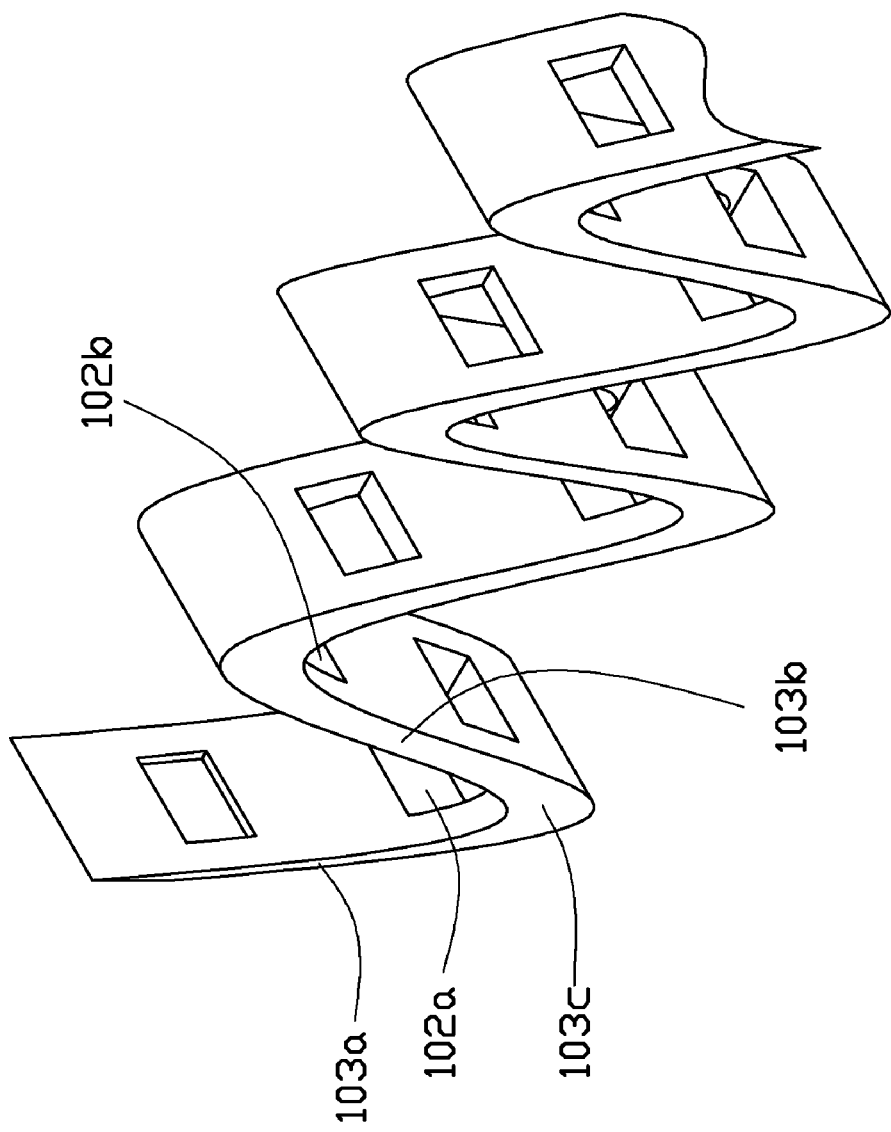
FIG. 4 is a partial, enlarged view of a cable retainer of the computer mouse of FIG. 3.

Referring also to FIGS. 3-4, the cable retainer 101 includes a number of connection elements 103 connected to each other and a number of holes defined in the connection elements 103. In one embodiment, the connection element 103 is made of metal. Each connection element 103 is V shaped, and includes a first connection portion 103a, a second connection portion 103b opposite to the first connection portion 103a, and a middle portion 103c connecting the first connection portion 103a to the second connection portion 103b. When pulled, the cable retainer 101 can be elastically stretched. Each first connection portion 103a defines a first hole 102a adjacent to the middle portion 103c, and each second connection portion 103b defines a second hole 102b away from the middle portion 103c. The cable 400 passes through each first hole 102a and each second hole 102b in turn, and distorts to have a number of V shaped segments. Because it is being retained in the cable retainer 101, the cable 400 takes up less space and will not become tangled.

The housing 10 includes a base 200 and a cover 300 fixed on the base 200. The base 200 includes a mediating member 201 and a first protruding wall 202 matching the mediating member 201. The cover 300 includes a second protruding wall 301 (see FIG. 2) opposite to the first protruding wall 202 and matching the mediating member 201. The mediating member 201 includes two opposite grooves 2011 (see FIG. 5) respectively formed at a top surface and a bottom surface thereof. The second protruding wall 301 is received in one of the grooves 2011 and the first protruding wall 202 is received in the other one of the grooves 2011. The mediating member 201 is thus fixed between the base 200 and the cover 300 after the base 200 and the cover 300 are connected together. The mediating member 201 further includes a sliding groove 2012 extending along the widthwise direction of the housing 10.

Figure 5:
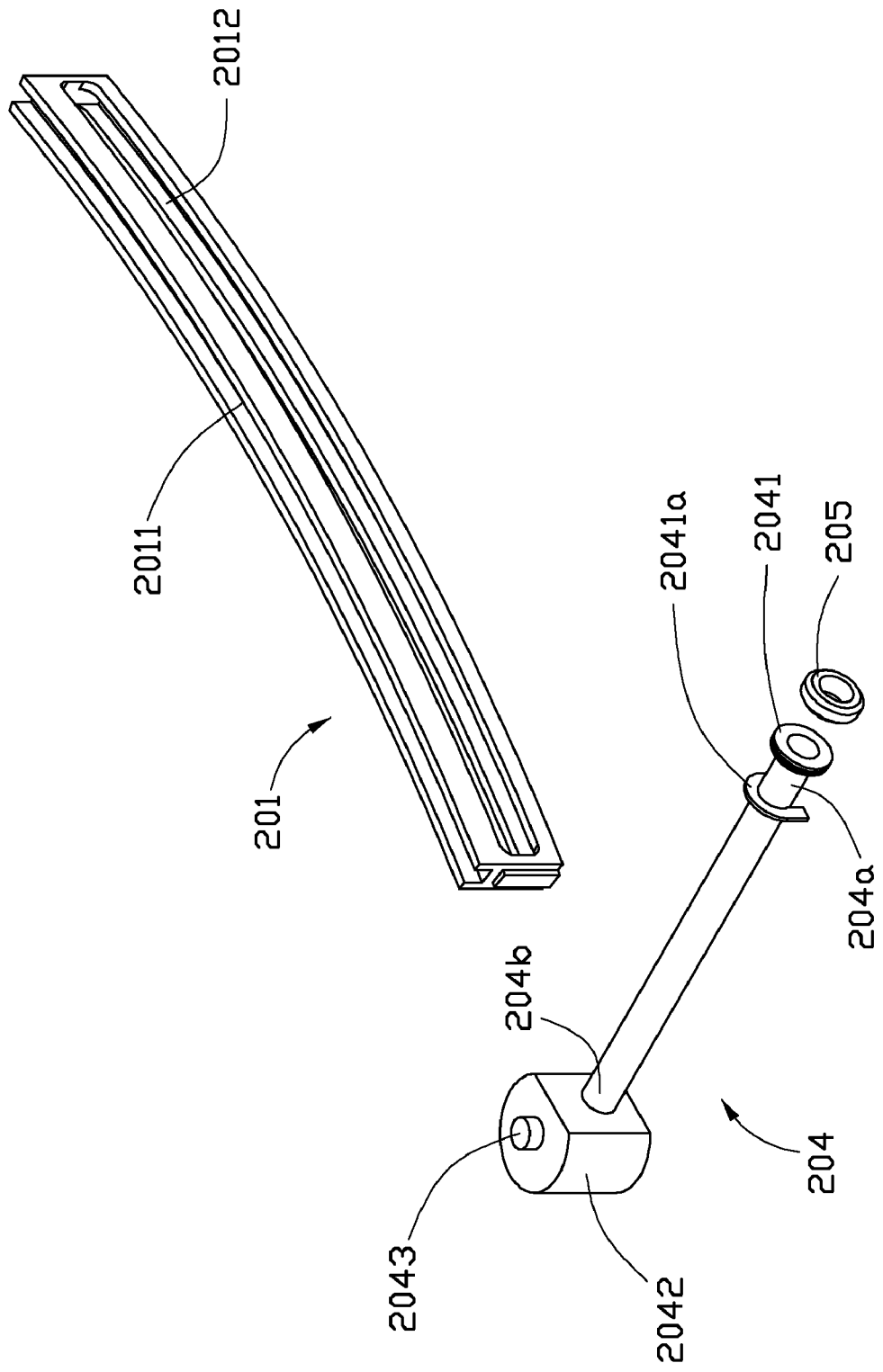
FIG. 5 is an enlarged view of a mediating member and a rotating member of the computer mouse of FIG. 3.

Referring also to FIG. 5, the base 200 further includes a rotating member 203 including a connecting bar 204, a wheel portion 205, and a seat 206. The connecting bar 204 is hollow and includes a ring 2041 extended around the outer surface of one end 204a of the connecting bar 204. A protruding wall 2041a radially extends from the outer surface adjacent to the ring 2041. In the embodiment, the protruding wall 2041a is substantially U shaped. The wheel portion 205 is rotatably arranged around the connecting bar 204 between the protruding wall 2041a and the ring 2041. The wheel portion 205 is slidably received in the sliding groove 2012. The connecting bar 204 further includes a rotation portion 2042 at the other end 204b thereof. Two opposite axles 2043 respectively extend from opposite ends of the rotation portion 2042. The axles 2043 are cylindrical. The seat 206 is fixed on the base 200, and includes two spaced arms 2062 each defining an axle hole 2061. The two axles 2043 are respectively received in the two opposite axle holes 2061, and are rotatable in the two axle holes 2061, thereby rotatably connecting the rotation portion 2042 to the seat 206.

One end of the cable 400 passes through the cable retainer 101 and is connected to a connector, and the other end passes through the connecting bar 204 to be fixed inside of the housing 10.

When the computer mouse 100 moves along a horizontal direction in a small predetermined range, the wheel portion 205 rolls in the sliding groove 2012 and a relative rotation movement occurs between the rotation portion 2042 and the housing 10, allowing the cable retainer 101 to maintain limited movement. In addition, the weight of the cable retainer 101 can also be calculated for maintaining the limited movement when the computer mouse 100 moves along a horizontal direction in a predetermined range.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A computer mouse comprising:

a housing, comprising a base and a cover fixed on the base, the base comprising a mediating member and a first protruding wall, the cover comprising a second protruding wall opposite to the first protruding wall, the mediating member comprising two opposite grooves respectively formed at a top surface and a lower surface thereof, wherein the first protruding wall is received in the groove of the top surface, the mediating member is thus fixed between the base and the cover;

a cable for connecting the computer mouse to a host device; and an elastic cable retainer defining a plurality of holes for allowing the cable to pass through;

wherein when the housing is moved, the cable retainer is stretched by the housing, allowing the cable to change from a compressed state to an extended state.

2. The computer mouse as described in claim 1, wherein the cable retainer comprises a plurality of connection elements connected to each other, each connection element is V shaped, and comprises a first connection portion, a second connection portion opposite to the first connection portion, and a middle portion connecting the first connection portion to the second connection portion, each first connection portion defines a first hole adjacent to the middle portion, and each second connection portion defines a second hole away from the middle portion, the cable passes through each first hole and each second hole in turn, and distorts to have a number of V shaped segments.

3. The computer mouse as described in claim 2, wherein each of the connection elements is made of metal.

4. The computer mouse as described in claim 1, wherein the mediating member further comprises a sliding groove extending along a widthwise direction of the housing, the base further comprises a rotating member, the rotating member comprises a connecting bar, and a wheel portion, the connecting bar is hollow and comprises a ring extended around an outer surface of one end of the connecting bar, and a protruding wall radially extending from the outer surface adjacent to the ring, the wheel portion is rotatably arranged around the connecting bar between the protruding wall and the ring.

5. The computer mouse as described in claim 4, wherein the connecting bar further comprises a rotation portion at another end thereof, two opposite axles respectively extend from opposite surfaces of the rotation portion, and are cylindrical, the rotating member further comprises a seat fixed on the base, the seat comprises two spaced arms defining two opposite axle holes, the two axles are respectively received in the two opposite axle holes, and are rotatable in the two axle holes.

6. The computer mouse as described in claim 5, wherein one end of the cable passes through the cable retainer and is connected to a connector, and the other end passes through the connecting bar to be fixed inside of the housing.

7. The computer mouse as described in claim 4, wherein the protruding wall of the connecting bar is substantially U shaped.

8. The computer mouse as described in claim 6, wherein when the computer mouse moves along a horizontal direction in a predetermined range, the wheel portion rolls in the sliding groove and a relative rotation movement occurs between the rotation portion and the housing, allowing the cable retainer to maintain limited movement.

* * * * *